United States Patent
Takata et al.

(10) Patent No.: US 12,469,122 B2
(45) Date of Patent: Nov. 11, 2025

(54) ARTICLE INSPECTION APPARATUS AND ARTICLE INSPECTION METHOD

(71) Applicant: ANRITSU CORPORATION, Kanagawa (JP)

(72) Inventors: Osamu Takata, Kanagawa (JP); Shinya Waki, Kanagawa (JP)

(73) Assignee: ANRITSU CORPORATION, Kanagawa (JP)

(*) Notice: Subject to any disclaimer, the term of this patent is extended or adjusted under 35 U.S.C. 154(b) by 399 days.

(21) Appl. No.: 18/045,636

(22) Filed: Oct. 11, 2022

(65) Prior Publication Data

US 2023/0122223 A1    Apr. 20, 2023

(30) Foreign Application Priority Data

Oct. 15, 2021    (JP) ................... 2021-169388

(51) Int. Cl.
*G06T 7/00* (2017.01)
*G06V 20/68* (2022.01)

(52) U.S. Cl.
CPC ............ *G06T 7/0008* (2013.01); *G06T 7/001* (2013.01); *G06V 20/68* (2022.01); *G06T 2207/10116* (2013.01); *G06T 2207/30128* (2013.01)

(58) Field of Classification Search
None
See application file for complete search history.

(56) References Cited

U.S. PATENT DOCUMENTS

| 10,859,516 B2 * | 12/2020 | Ikeda ............. G01N 23/087 |
| 2022/0270238 A1 * | 8/2022 | Mc Donnell ........ G06V 20/68 |

FOREIGN PATENT DOCUMENTS

| EP | 3598114 A1 * | 1/2020 | ............. G01N 23/04 |
| JP | 3888623 B2 * | 3/2007 | |
| JP | 2011072886 A * | 4/2011 | |
| JP | 2015158351 A * | 9/2015 | ............. G06F 13/385 |

* cited by examiner

*Primary Examiner* — Andrew W Bee
*Assistant Examiner* — Christine Zhao
(74) *Attorney, Agent, or Firm* — McDonald Hopkins LLC

(57) ABSTRACT

An article inspection apparatus inspects a workpiece W including a plurality of ingredients Wa, Wb, Wc, and Wd by using an inspection image of the workpiece. The article inspection apparatus includes an X-ray image memory 61 that stores information of a predetermined detection value related to the inspection image, a configuration determination unit 53 that determines a material configuration of a content in the workpiece W by performing predetermined recognition processing based on image data of the workpiece W obtained by capturing of the camera 41, and a proposal output unit 54 that, when the configuration determination unit 53 determines the material configuration of the content, estimates detection sensitivity to the predetermined detection value based on information stored in the X-ray image memory 61 and a management sensitivity memory 64, and proposes and outputs a determination criterion for an article inspection.

15 Claims, 7 Drawing Sheets

ARTICLE INSPECTION APPARATUS AND ARTICLE INSPECTION METHOD

TECHNICAL FIELD

The present invention relates to an article inspection apparatus and an article inspection method, and particularly to an article inspection apparatus and an article inspection method for inspecting an inspection article based on an inspection image of the inspection article.

BACKGROUND ART

Conventionally, there have been known an apparatus and a method in which an X-ray inspection area is provided in a manufacturing line for various inspection articles (meat, fish and shellfish, processed foods, pharmaceuticals, and the like), the inspection article being transported is irradiated with an X-ray, and the inspection article is inspected based on an X-ray inspection image, for example, an article inspection apparatus and method capable of inspecting whether a foreign matter is contained, there is a missing item, or packaging failure has occurred.

In such an article inspection apparatus and method, an X-ray line sensor or the like sequentially detects X-rays transmitted through the inspection article being transported, to create multi-gradation X-ray image data corresponding to X-ray transmission amount distribution for each predetermined time, and filter processing, differentiation processing, and other image processing are performed on the X-ray image data to determine whether or not there is a foreign matter or missing items in the inspection article.

In addition, since the transmission amount of the X-ray varies depending on the contents of the inspection article, the thickness of the inspection article in an X-ray transmission direction, whether or not there is a foreign matter or a missing item, and the like. Thus, in many cases, in order to obtain an accurate inspection result, when a new article type is registered in the article inspection apparatus, not only parameters for specifying the wavelength or irradiation intensity of the X-ray, image processing conditions, and the like are set corresponding to the article type, but also whether or not a determination threshold value (also referred to as a limit below) when a foreign matter or a missing item is detected based on an inspection image is appropriate is checked by using an article sample or a test piece of a foreign matter to be detected.

In this type of article inspection apparatus and method, for example, in a case where the inspection article is a lunch box in which a plurality of ingredients are stored in a pack, foreign-matter detection can be performed with the required sensitivity in a manner that a plurality of inspection areas can be designated in an X-ray inspection image of this article, and limits corresponding to the types of ingredients can be set, the size of the foreign matter to be detected, and the like for each designated area (for example, see Patent Document 1).

RELATED ART DOCUMENT

Patent Document

[Patent Document 1] Japanese Patent No. 3888623

DISCLOSURE OF THE INVENTION

Problem that the Invention is to Solve

However, in the conventional article inspection apparatus and article inspection method, in order to perform an article inspection with high sensitivity, a task of setting a determination criterion such as a determination threshold level as an inspection parameter for each type of inspection article is required. Thus, in a case where similar articles of many types are set to be an inspection target, or in industries where new article types are frequently replaced, the burden of the task of setting the determination criterion has been felt to be heavy.

In addition, as in the conventional example described above, in a case where a plurality of inspection target areas are designated in an inspection image area, high-sensitivity foreign matter detection, missing item inspection, and the like are possible. However, when the number of designated areas is large or an inexperienced operator performs the setting task, it is necessary to set the determination criterion such as the determination threshold level for each designated area, which increases the burden of the setting task.

The present invention has been made to solve such conventional problems, and an object of the present invention is to provide an article inspection apparatus and an article inspection method capable of reducing the burden of the task of setting a determination criterion being an inspection parameter for each article type, while ensuring required inspection sensitivity.

Means for Solving the Problem

According to a first aspect of the present invention, an article inspection apparatus inspects an inspection article by using an inspection image. The article inspection apparatus includes an information storage unit that stores information of a predetermined detection value related to the inspection image, an article image capturing unit that captures an image of the inspection article, a configuration determination unit that determines a material configuration of the inspection article by performing predetermined recognition processing based on image data of the inspection article obtained by capturing of the article image capturing unit, and a proposal output unit that estimates detection sensitivity to the predetermined detection value based on the material configuration of the inspection article, which has been determined by the configuration determination unit, and proposes and outputs a determination criterion for the inspection.

With this configuration, according to the present invention, the configuration determination unit performs predetermined recognition processing based on image data of an inspection article obtained by capturing of the article image capturing unit, and determines a material configuration of the inspection article. Then, in the proposal output unit, the detection sensitivity of a predetermined detection value corresponding to a pixel value of an inspection image is estimated in accordance with the material configuration of the inspection article, and a determination criterion for an inspection are proposed and output based on information stored in the information storage unit, at a suitable reference value level corresponding to the estimated detection sensitivity. As a result, it is possible to sufficiently reduce a burden of a task of setting the determination criterion such as the determination threshold level, which is an inspection parameter for each article type.

According to a second aspect of the present invention, the article inspection apparatus in the first aspect further includes a sensitivity influence material storage unit that stores information of a sensitivity influence on the predetermined detection value of each of a plurality of materials. The proposal output unit estimates the detection sensitivity to the predetermined detection value based on information of the material configuration acquired by the predetermined recognition processing in the configuration determination unit and stored information in the sensitivity influence material storage unit, which corresponds to the material configuration.

With this configuration, when the configuration determination unit acquires the information of the material configuration of the inspection article, it is possible to grasp, for the material configuration, a sensitivity influence level with respect to the predetermined detection value based on information stored in a sensitivity influence material storage unit. Therefore, it is possible to propose and output appropriate a determination criterion for an article inspection in accordance with the material configuration having a significant influence on the predetermined detection value.

According to a third aspect of the present invention, in the article inspection apparatus in the first aspect, the configuration determination unit includes image input means for inputting the image of the inspection article as a character-recognizable image and/or an image-recognizable image, and recognition processing means for performing character recognition and/or image recognition of the image input by the image input means and acquiring first material information corresponding to at least a material configuration of a specific content in the inspection article.

With this configuration, first material information corresponding to at least the material configuration of a specific content is acquired by character recognition or image recognition based on the image input by the image input means. Therefore, when the first material information having a significant influence on the predetermined detection value is acquired, it is possible to propose and output the determination criterion necessary for the article inspection in accordance with a sensitivity influence level.

According to a fourth aspect of the present invention, in the article inspection apparatus in the second aspect, the configuration determination unit includes image input means for inputting the image of the inspection article as a character-recognizable image and/or an image-recognizable image, and recognition processing means for performing character recognition and/or image recognition of the image input by the image input means and acquiring first material information corresponding to at least a material configuration of a specific content in the inspection article.

With this configuration, the first material information corresponding to at least the material configuration of the specific content is acquired by character recognition or image recognition based on the image input by the image input means. Therefore, when the first material information having a significant influence on the predetermined detection value is acquired, it is possible to propose and output the determination criterion necessary for the article inspection in accordance with a sensitivity influence level.

According to a fifth aspect of the present invention, in the article inspection apparatus in the third aspect, the recognition processing means of the configuration determination unit acquires second material information regarding a material configuration of another content similar to the material configuration of the specific content, based on a result obtained by performing character recognition and/or image recognition of the image input by the image input means, in addition to the first material information, the second material information corresponding to a difference from the first material information.

In this case, the second material information for a material configuration of another content similar to the material configuration of the specific content, which corresponds to the difference from the first material information is acquired based on the result obtained by performing character recognition and/or image recognition from the input image, in addition to the first material information. Therefore, an article inspection apparatus in which it is possible to use known sensitivity information for an inspection article having another similar content instead of the specific content, and to quickly, easily, and precisely perform a setting task of a determination threshold level as the inspection parameter for each article type is obtained.

An article inspection apparatus according to a sixth aspect of the present invention is the article inspection apparatus according to the fourth aspect, wherein the recognition processing means of the configuration determination unit acquires second material information regarding a material configuration of another content similar to the material configuration of the specific content, based on a result obtained by performing character recognition and/or image recognition of the image input by the image input means, in addition to the first material information, the second material information corresponding to a difference from the first material information.

In this case, the second material information for a material configuration of another content similar to the material configuration of the specific content, which corresponds to the difference from the first material information is acquired based on the result obtained by performing character recognition and/or image recognition from the input image, in addition to the first material information. Therefore, an article inspection apparatus in which it is possible to use known sensitivity information for an inspection article having another similar content instead of the specific content, and to quickly, easily, and precisely perform a setting task of a determination threshold level as the inspection parameter for each article type is obtained.

According to a seventh aspect of the present invention, in the article inspection apparatus in the first aspect, the inspection article has a configuration in which a plurality of contents are arranged in a plurality of corresponding arrangement areas. The configuration determination unit determines a material configuration of a content in each of the plurality of arrangement areas by performing the predetermined recognition processing based on image data of the content in each corresponding arrangement area, for each of the plurality of arrangement areas, the image data being obtained by capturing of the article image capturing unit. The proposal output unit proposes and outputs a determination criterion for each of the plurality of arrangement areas based on a determination result of the configuration determination unit.

In this case, information of predetermined detection values related to a plurality of contents is stored in association with a plurality of arrangement areas, so that it is possible to precisely propose and output the determination criterion for each arrangement area in accordance with the material configuration of the content in each arrangement area.

According to an eighth aspect of the present invention, in the article inspection apparatus in the second aspect, the inspection article has a configuration in which a plurality of contents are arranged in a plurality of corresponding arrangement areas. The configuration determination unit determines a material configuration of a content in each of the plurality of arrangement areas by performing the predetermined recognition processing based on image data of the content in each corresponding arrangement area, for each of the plurality of arrangement areas, the image data being obtained by capturing of the article image capturing unit.

The proposal output unit proposes and outputs a determination criterion for each of the plurality of arrangement areas based on a determination result of the configuration determination unit.

In this case, information of predetermined detection values related to a plurality of contents is stored in association with a plurality of arrangement areas, so that it is possible to precisely propose and output the determination criterion for each arrangement area in accordance with the material configuration of the content in each arrangement area.

According to a ninth aspect of the present invention, in the article inspection apparatus in the third aspect, the inspection article has a configuration in which a plurality of contents are arranged in a plurality of corresponding arrangement areas. The configuration determination unit determines a material configuration of a content in each of the plurality of arrangement areas by performing the predetermined recognition processing based on image data of the content in each corresponding arrangement area, for each of the plurality of arrangement areas, the image data being obtained by capturing of the article image capturing unit. The proposal output unit proposes and outputs a determination criterion for each of the plurality of arrangement areas based on a determination result of the configuration determination unit.

In this case, information of predetermined detection values related to a plurality of contents is stored in association with a plurality of arrangement areas, so that it is possible to precisely propose and output the determination criterion for each arrangement area in accordance with the material configuration of the content in each arrangement area.

According to a tenth aspect of the present invention, in the article inspection apparatus in the fifth aspect, the inspection article has a configuration in which a plurality of contents are arranged in a plurality of corresponding arrangement areas. The configuration determination unit determines a material configuration of a content in each of the plurality of arrangement areas by performing the predetermined recognition processing based on image data of the content in each corresponding arrangement area, for each of the plurality of arrangement areas, the image data being obtained by capturing of the article image capturing unit. The proposal output unit proposes and outputs a determination criterion for each of the plurality of arrangement areas based on a determination result of the configuration determination unit.

In this case, information of predetermined detection values related to a plurality of contents is stored in association with a plurality of arrangement areas, so that it is possible to precisely propose and output the determination criterion for each arrangement area in accordance with the material configuration of the content in each arrangement area.

According to an eleventh aspect of the present invention, the article inspection apparatus in the seventh aspect further includes an article-type registration information storage unit that stores an article type and setting information of the inspection article together with information of the material configuration. The configuration determination unit determines whether or not a partial change having a significant influence on the predetermined detection value has occurred in the material configuration of the content corresponding to each arrangement area, based on the information stored in the article-type registration information storage unit and information acquired by the predetermined recognition processing, for each of the plurality of arrangement areas in the inspection article.

In this case, for each of the plurality of arrangement areas, whether or not a partial change having a significant influence on the predetermined detection value has occurred is determined by comparing the material configuration of the content as an inspection target to the material configuration of a content having the registered article type, based on the material configuration of the content having the article type registered already and information acquired by the predetermined recognition processing. Therefore, it is possible to precisely propose and output the necessary adjustment of the determination criterion while using the setting information of the content having the registered article type.

According to a twelfth aspect of the present invention, the article inspection apparatus in the eighth aspect further includes an article-type registration information storage unit that stores an article type and setting information of the inspection article together with information of the material configuration. The configuration determination unit determines whether or not a partial change having a significant influence on the predetermined detection value has occurred in the material configuration of the content corresponding to each arrangement area, based on the information stored in the article-type registration information storage unit and information acquired by the predetermined recognition processing, for each of the plurality of arrangement areas in the inspection article.

In this case, for each of the plurality of arrangement areas, whether or not a partial change having a significant influence on the predetermined detection value has occurred is determined by comparing the material configuration of the content as an inspection target to the material configuration of a content having the registered article type, based on the material configuration of the content having the article type registered already and information acquired by the predetermined recognition processing. Therefore, it is possible to precisely propose and output the necessary adjustment of the determination criterion while using the setting information of the content having the registered article type.

According to a thirteenth aspect of the present invention, the article inspection apparatus in the ninth aspect further includes an article-type registration information storage unit that stores an article type and setting information of the inspection article together with information of the material configuration. The configuration determination unit determines whether or not a partial change having a significant influence on the predetermined detection value has occurred in the material configuration of the content corresponding to each arrangement area, based on the information stored in the article-type registration information storage unit and information acquired by the predetermined recognition processing, for each of the plurality of arrangement areas in the inspection article.

In this case, for each of the plurality of arrangement areas, whether or not a partial change having a significant influence on the predetermined detection value has occurred is determined by comparing the material configuration of the content as an inspection target to the material configuration of a content having the registered article type, based on the material configuration of the content having the article type registered already and information acquired by the predetermined recognition processing. Therefore, it is possible to precisely propose and output the necessary adjustment of the determination criterion while using the setting information of the content having the registered article type.

According to a fourteenth aspect of the present invention, the article inspection apparatus in the tenth aspect further includes an article-type registration information storage unit that stores an article type and setting information of the inspection article together with information of the material configuration. The configuration determination unit determines whether or not a partial change having a significant influence on the predetermined detection value has occurred in the material configuration of the content corresponding to each arrangement area, based on the information stored in the article-type registration information storage unit and information acquired by the predetermined recognition processing, for each of the plurality of arrangement areas in the inspection article.

In this case, for each of the plurality of arrangement areas, whether or not a partial change having a significant influence on the predetermined detection value has occurred is determined by comparing the material configuration of the content as an inspection target to the material configuration of a content having the registered article type, based on the material configuration of the content having the article type registered already and information acquired by the predetermined recognition processing. Therefore, it is possible to precisely propose and output the necessary adjustment of the determination criterion while using the setting information of the content having the registered article type.

According to a fifteenth aspect of the present invention, there is provided an article inspection method of inspecting an inspection article by using an inspection image. The article inspection method includes an information storage step of storing information of a predetermined detection value related to the inspection image, an article image capturing step of capturing an image of the inspection article, a configuration determination step of determining a material configuration of the inspection article by performing predetermined recognition processing based on image data of the inspection article, which is obtained by capturing in the article image capturing step, and a proposal output step of estimating detection sensitivity to the predetermined detection value based on the material configuration of the inspection article determined in the configuration determination step, and proposing and outputting a determination criterion for the inspection.

With this configuration, in the article inspection method according to the present invention, predetermined recognition processing is performed, in the configuration determination step, based on an appearance image data of the inspection article obtained by capturing in the article image capturing step, and the material configuration of the inspection article is determined. Then, in the proposal output step, the detection sensitivity of the predetermined detection value corresponding to the pixel value and the like of the inspection image is estimated while taking into consideration of the influence on the detection sensitivity corresponding to the material configuration of the inspection article, and the determination criterion for the inspection based on the information stored in the information storage step are proposed and output at a suitable reference value level corresponding to the estimated detection sensitivity. As a result, it is possible to sufficiently reduce a burden of a task of setting the determination criterion such as the determination threshold level, which is an inspection parameter for each article type.

According to a sixteenth aspect of the present invention, an article inspection apparatus inspects an article containing a plurality of contents by using an inspection image. The article inspection apparatus includes an information storage unit that stores information of a predetermined detection value related to the inspection image, an article image capturing unit that captures an image of the inspection article, a configuration determination unit that determines a material configuration of the inspection article by performing predetermined recognition processing based on image data of the inspection article obtained by capturing of the article image capturing unit, and a proposal output unit that, when the configuration determination unit determines the material configuration of the content, estimates detection sensitivity to the predetermined detection value based on the material configuration of the content and proposes and outputs determination criterion for the article inspection.

With this configuration, according to the present invention, the configuration determination unit performs predetermined recognition processing based on image data of the inspection article obtained by capturing of the article image capturing unit, and determines the material configuration of the content of the inspection article. Then, in the proposal output unit, the detection sensitivity of a predetermined detection value corresponding to a pixel value of an inspection image is estimated in accordance with the material configuration of the content, and a determination criterion for the article inspection are proposed and output based on information stored in the information storage unit, at a suitable reference value level corresponding to the estimated detection sensitivity. As a result, it is possible to sufficiently reduce a burden of a task of setting the determination criterion such as the determination threshold level, which is an inspection parameter for each article type.

Advantage of the Invention

According to the present invention, it is possible to provide an article inspection apparatus and an article inspection method capable of reducing the burden of the task of setting a determination criterion being an inspection parameter for each article type, while ensuring required inspection sensitivity.

BEST MODE FOR CARRYING OUT THE INVENTION

Hereinafter, embodiments according to the present invention will be described with reference to the drawings.

FIGS. 1 to 4 illustrate the configuration of an article inspection apparatus according to an embodiment of the present invention.

First, the configuration will be described.

Figure 1:
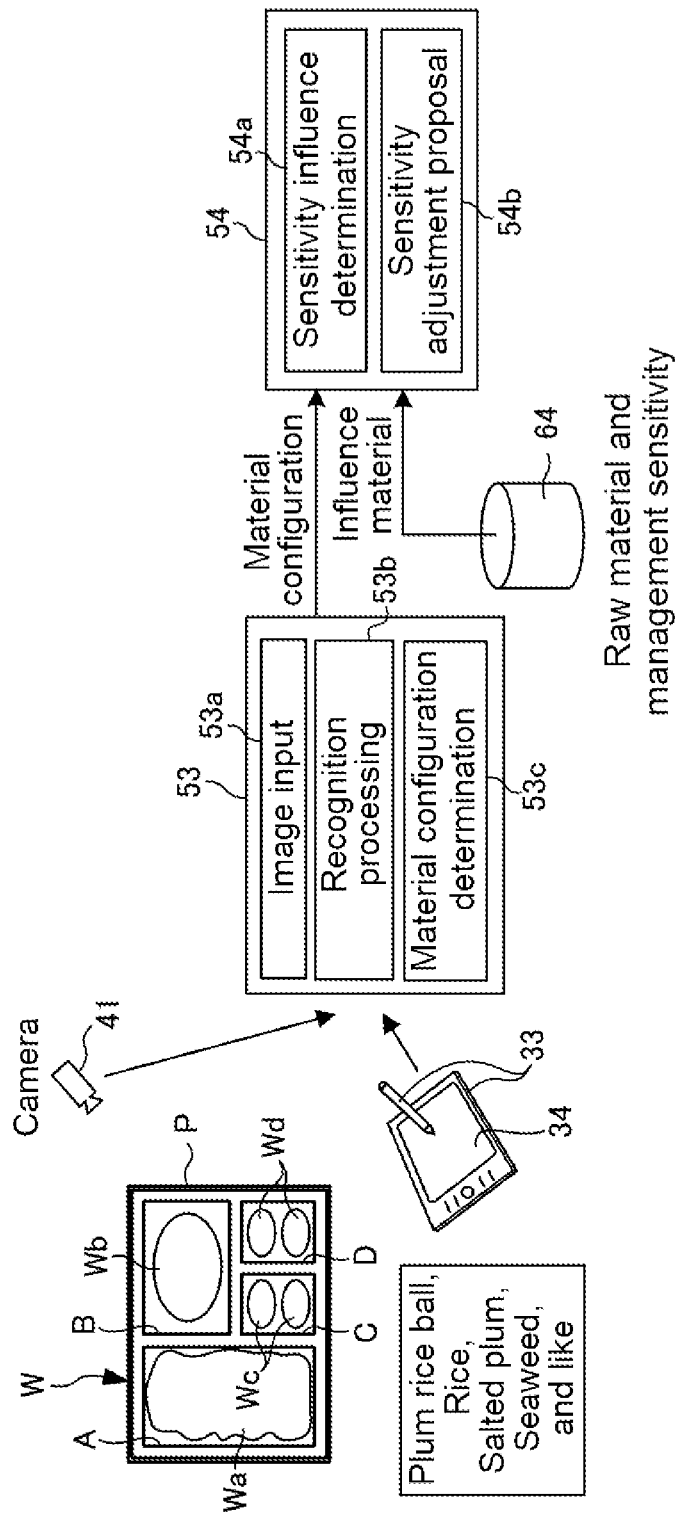
FIG. 1 is a schematic diagram conceptually illustrating a schematic configuration of main components of an article inspection apparatus according to an embodiment of the present invention.
Figure 2:
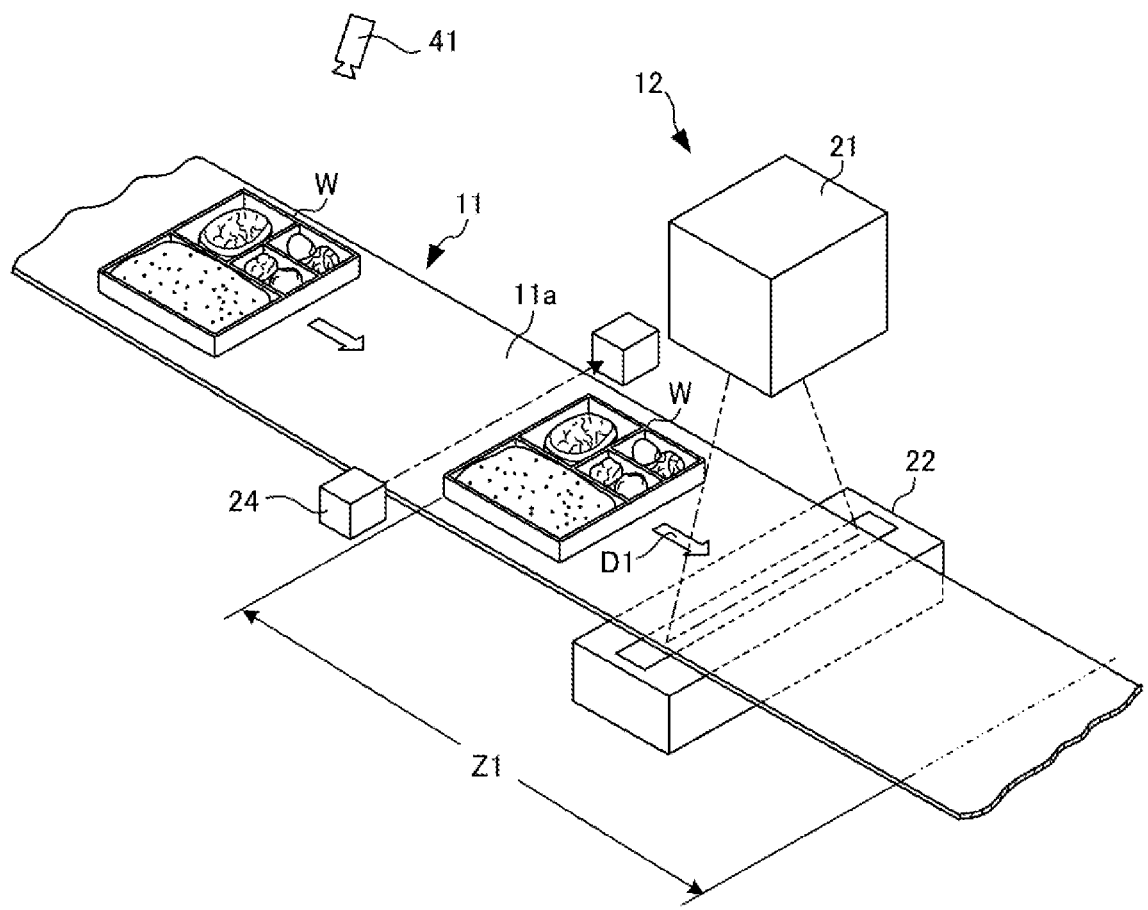
FIG. 2 is a partial perspective view illustrating a schematic configuration near an X-ray inspection area in the article inspection apparatus according to the embodiment of the present invention.
Figure 3:
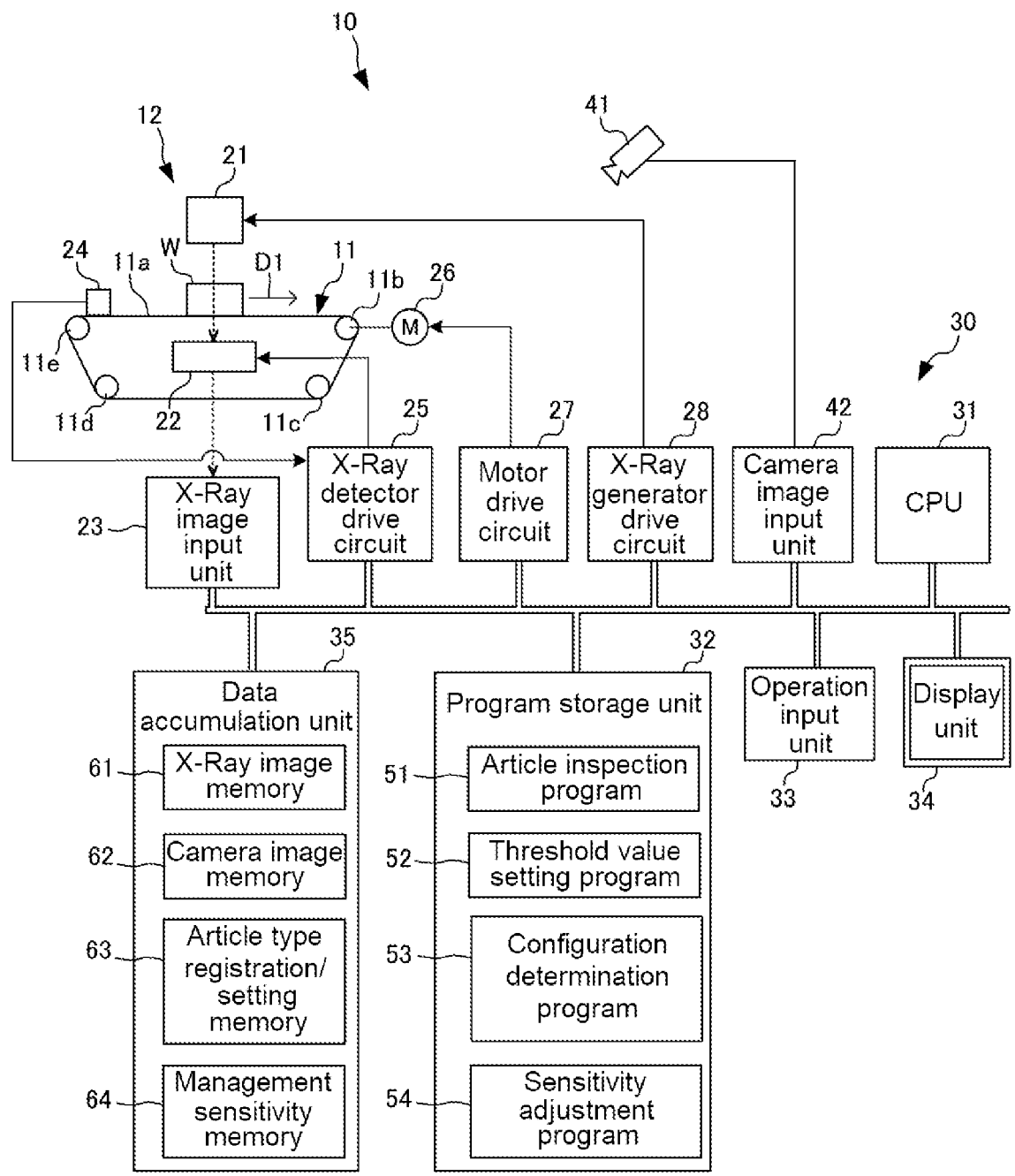
FIG. 3 is a schematic system configuration diagram in which a system configuration of a control system in the article inspection apparatus according to the embodiment of the present invention is illustrated in a block diagram.

An article inspection apparatus 10 according to the present embodiment, which is illustrated in FIGS. 1 to 3 is an X-ray inspection apparatus in which a workpiece W being transported is inspected by an inspection unit 12 using a predetermined inspection image, for example, an X-ray inspection image while the workpiece W (inspection object) being an inspection object is transported by a transport unit 11. The article inspection apparatus 10 detects whether or not foreign matters are contained in the workpiece W or there is a missing item, for example.

The workpiece W is a product that is produced and shipped as meat, fish and shellfish, processed food, pharmaceuticals, and the like. Here, food, for example, a packed lunch box will be described as a typical example. The workpiece W has a form in which, as a plurality of contents, a pack P having a plurality of recessed arrangement areas A to D, and a plurality of ingredients stored and arranged in the plurality of arrangement areas A to D, for example, a staple food Wa, a main dish Wb, a side dish Wc, and a sub-side dish Wd are served in respective determined arrangement areas A to D. The pack P referred to here has a transparent upper lid and a cover portion made of plastic wrap (not illustrated). In addition, the food referred to here may be packed noodles, packaged rice balls, and the like. The plurality of ingredients may be the main ingredients and ingredients of the noodles, the main ingredients and ingredients of the rice balls, and the like. Alternatively, the plurality of ingredients may be an assorted pack or the like in which a plurality of types of cakes are combined, regardless of the names such as the staple food Wa and the main dish Wb.

As described above, a plurality of types of ingredients to be served in the respective arrangement areas A to D of the pack P are selectively combined from ingredient candidates determined in advance as manufacturable ingredients.

Regarding a lunch box as an example, a plurality of types of lunch boxes in which some ingredients and servings are different for each delivery destination are manufactured. Even though the delivery destination is the same and the lunch box has the same type, the ingredients may be changed according to the season, and the serving amount of some ingredients may be changed due to a campaign or the like.

The staple food Wa, the main dish Wb, the side dish Wc, and the sub-side dish Wd are different types of ingredients that have been processed or cooked in a processing/cooking process. A predetermined amount is served in each of the arrangement areas A to D of the pack P in a serving process. A lid is closed with an upper lid or plastic wrapping film, and the workpiece W is carried into an inspection process. The article inspection apparatus 10 (X-ray inspection apparatus) inspects the workpiece W in the inspection process, and the workpiece W determined to be non-defective is carried out to the next process.

The transport unit 11 is, for example, a belt conveyor type. Thus, the transport unit 11 can transport an article placed on a conveyor belt 11a in a D1 direction in FIG. 2 by supporting the endless conveyor belt 11a in a predetermined shape as illustrated in FIG. 3 with downstream rollers 11b and 11c and upstream rollers 11d and 11e in contact with the inner circumferential surface side of the conveyor belt 11a.

The inspection unit 12 includes an X-ray source 21, an X-ray detector 22 such as an X-ray line sensor, an X-ray image input unit 23, and an article detection sensor 24. The X-ray source 21 outputs X-rays in a direction perpendicular to the D1 direction from an X-ray tube or the like located above the conveyor belt 11a of the transport unit 11. The X-ray detector 22 is located in the conveyor belt 11a of the transport unit 11. The X-ray image input unit 23 generates line image data corresponding to the transmission amount of the X-ray that has been transmitted through the workpiece W and detected by the X-ray detector 22, for each predetermined time. The article detection sensor 24 detects the entry of the workpiece W into a predetermined inspection area Z1.

The X-ray source 21 includes an X-ray tube (not illustrated) therein. Although details are not illustrated, electrons that have been emitted from a filament on the cathode side within an envelope in the X-ray tube and condensed by a condensing electrode are made to collide with a target on the anode side facing the filament. In this manner, X-rays are generated from the target. The X-ray source 21 may use, for example, a rotating type target or the like. In any case, the X-ray source can irradiate the workpiece W on the transport unit 11 with X-rays in a fan beam shape perpendicular to the direction D1, and forms an X-ray irradiation area in a range covering the passage cross section of the workpiece W within the inspection area Z1.

The X-ray detector 22 is configured by an X-ray line sensor camera in which detection elements including a scintillator that emits fluorescence when exposed to X-rays, and photodiodes or charge-coupled elements that are light receiving elements are arranged in an array at a predetermined pitch in a passage width direction of the transport unit 11, and X-ray detection is performed at a predetermined resolution. The X-ray detector 22 may use a semiconductor sensor using an X-ray conversion film, or may be an area sensor in which a plurality of detection elements are arranged two-dimensionally. The X-ray detector 22 is selected in accordance with the characteristics of the workpiece W and the performance required for the inspection.

The X-ray image input unit 23 can perform A/D conversion of, for example, a transmission amount detection signal from each detection element in the X-ray detector 22, and generates data of an accumulated X-ray transmission amount (also referred to as a transmission amount below) for each predetermined unit transport time, as line scanning image data of density levels representing, for example, 0 to 1023 gradations. The X-ray image input unit 23 can output X-ray transmission image data of each workpiece W by repeating the line scanning image generation by the X-ray detector 22 a predetermined number of times during the inspection period corresponding to each workpiece W.

For example, as indicated by a one-dot chain line in FIG. 2, the article detection sensor 24 is configured by a photoelectric sensor having an optical axis in the passage width direction at a predetermined height position above the conveyor belt 11a of the transport unit 11.

The inspection unit 12 further includes an X-ray detector drive circuit 25, a transport driving motor 26, a motor drive circuit 27, and an X-ray generator drive circuit 28. The X-ray detector drive circuit 25 outputs detection data corresponding to the transmission amount from the X-ray detector 22 for each predetermined time. The transport driving motor 26 is coupled to a driving roller 11*b* engaged with the conveyor belt 11*a* on the downstream end side in a transport direction of the transport unit 11 and drives the transport unit 11 through the driving roller 11*b*. The motor drive circuit 27 can control driving of the transport driving motor 26. The X-ray generator drive circuit 28 can control an X-ray irradiation condition of the X-ray source 21 with a tube current, a tube voltage, and the like of the X-ray tube.

In the inspection unit 12, a control circuit 30 manages setting information such as control parameters for an operation mode and various conditions, article type registration information of the workpiece W, and the like, and controls an article inspection condition in accordance with the article type of the workpiece W.

As illustrated in FIG. 3, the control circuit 30 includes a CPU 31, a program storage unit 32, an operation input unit 33 and a display unit 34, and a data accumulation unit 35. The program storage unit 32 stores a program for performing an article inspection function including foreign matter detection of an X-ray inspection type. The operation input unit 33 and the display unit 34 are configured by a touch panel, a tablet type of other portable information terminal, or the like, and receive an input of an operation such as setting and a selection instruction and displays a screen corresponding to the received input. The data accumulation unit 35 stores inspection result information, various setting conditions related to the article inspection, and other types of management information.

A camera 41, which is a visual sensor, is connected to the control circuit 30 via a camera image input unit 42, which is a camera controller. The camera 41, which is usually installed as a manufacturing line monitoring camera, may also be used for article type confirmation, so that equipment can be used efficiently and an article type confirmation task can be left as a monitoring record. Alternatively, the camera 41 may be installed as a type confirmation camera in the vicinity of the serving process to eliminate the need to bring samples of the workpiece W to the inspection process, and to obtain a camera angle and angle of view suitable for capturing an image of the appearance of the workpiece W.

The CPU 31 is configured by an industrial controller, a PC, or the like that executes a program in the program storage unit 32 in response to an operation input from the operation input unit 33. The CPU 31 can communicate with the X-ray image input unit 23 of the inspection unit 12, the X-ray detector drive circuit 25, the motor drive circuit 27, and the X-ray generator drive circuit 28 in a predetermined bus format (for example, field network communication).

The CPU 31 can perform an operation of sequentially storing the line image data from the X-ray image input unit 23 or X-ray transmission image data of each workpiece W for each inspection period, in the data accumulation unit 35. In addition, the CPU 31 can perform an operation of sequentially writing image data from the camera 41 into the data accumulation unit 35 via the camera image input unit 42.

The program storage unit 32 stores, as a plurality of control programs executed by the CPU 31, an article inspection program 51, a threshold value setting program 52, a configuration determination program 53, and a sensitivity adjustment program 54 (proposal output unit), a program for registering and setting various parameters (not illustrated), and the like. The article inspection program 51 is an execution program for an article inspection, for example, an article inspection capable of detecting a foreign matter or a missing item. The threshold value setting program 52 is provided for setting a determination threshold value used to determine foreign matter detection or missing item detection based on the X-ray inspection image related to the article inspection. The configuration determination program 53 is provided for classifying and specifying material configurations (for example, type and amount of the main material) of ingredients Wa to Wd being the contents of the workpiece W by image recognition or character recognition using the image from the camera 41. The sensitivity adjustment program 54 can estimate a detection sensitivity level of the X-ray transmission amount and the like related to the X-ray transmission image data with respect to the material configuration of each content determined by the configuration determination program 53, and propose and output a determination criterion for the article inspection based on the X-ray transmission image.

Although the details will be described later, from a viewpoint of whether or not the material configuration of the ingredient Wa, Wb, Wc, or Wd being each content of the workpiece W as an inspection target is suitable for utilizing the determination threshold value (limit) of a foreign matter or a missing item with respect to a reference workpiece having a similar configuration, the sensitivity adjustment program 54 has functions of estimating the detection sensitivity under a predetermined X-ray irradiation condition in consideration of a difference in an X-ray transmission amount (predetermined detection value) by the material configuration, and, in a case where the utilization of the determination threshold value is not suitable, proposing and outputting sensitivity adjustment corresponding to the difference in material configuration between a new workpiece W to be inspected and a workpiece W having the similar configuration.

The data accumulation unit 35 includes an X-ray image memory 61, a camera image memory 62, an article type registration/setting memory 63, and a management sensitivity memory 64 (sensitivity influence material storage means). The X-ray image memory 61 can sequentially store X-ray transmission image data of each workpiece W for each inspection period. The camera image memory 62 can sequentially write image data from the camera 41 for each inspection period of each workpiece W through the camera image input unit 42. The article type registration/setting memory 63 stores and retains article type registration information used in the article inspection program 51 in the program storage unit 32 and various other parameters set by the registration/setting program described above. The management sensitivity memory 64 stores the determination threshold value of a foreign matter or a missing item corresponding to the material configuration of the workpiece W for each article type, that has been set by the threshold value setting program 52, but adjusted and proposed by the sensitivity adjustment program 54, and permitted by an operator, together with information of an influence degree (sensitivity influence) of the corresponding main material configuration.

Here, the X-ray image memory 61 functions as an information storage unit that stores information of a predetermined detection value such as the X-ray transmission amount related to an article inspection as X-ray inspection image data (density image data corresponding to the X-ray transmission amount) for each workpiece W. The camera image memory 62 stores the image from the camera 41 as visual sensor information for each workpiece W that can be subjected to processing of image recognition and character recognition, which will be described later.

The article type registration/setting memory 63 stores and retains various control parameters that are normally set in addition to the determination threshold value as the inspection parameter for each article type of the workpiece W, in association with the article name, the main material configuration, the packaging form, and the like. Here, the workpiece W of the article type set already or each content Wa, Wb, Wc, or Wd can be used as a reference workpiece of a similar material configuration described later or a reference material configuration.

The workpiece W in the present embodiment has a configuration in which ingredients being a plurality of contents, for example, the staple food Wa, the main dish Wb, the side dish Wc, and the sub-side dish Wd are arranged in a plurality of recessed arrangement areas A to D of the pack P. The management sensitivity memory 64 of the data accumulation unit 35 stores, in association with the plurality of arrangement areas A to D, information regarding sensitivity influences corresponding to the material configurations of a plurality of contents, that is, the characteristics (for example, material amount, density, thickness, and the like) of the material corresponding to the X-ray transmittance of the content appearing as a significant difference for determination of the quality as the density change of a pixel on the X-ray transmission image data.

The camera 41 is configured by, for example, a Bayer video camera or a multi-plate prism spectral color area scan camera that may function as a color camera and a monochrome camera, in the article image capturing unit that captures an image of the workpiece W. At least one camera 41 is installed as a network camera or a USB video class camera (UVC camera) on the manufacturing line or in the vicinity of the serving task position in the serving process in the manufacturing line.

The camera image input unit 42 can perform preprocessing such as noise removal, image enhancement, distortion correction, and the like. Furthermore, association with the transport direction in the X-ray inspection image, image clipping processing, and rotation processing can be performed. Thus, the layout of the arrangement areas A to D in the pack P between the image data from the camera 41 and the X-ray transmission image can be accurately associated and reliably specified. This eliminates the installation conditions and adjustment conditions of the camera 41, particularly the need to capture an image of the workpiece W from directly above, and thus restrictions and labor associated with camera angles are reduced as long as the resolution is ensured.

More specifically, the X-ray inspection images sequentially taken into the X-ray image memory 61 of the data accumulation unit 35 from the X-ray detector 22 via the X-ray image input unit 23 are pre-processed in a state where the pixel values corresponding to the predetermined detection values such as the X-ray transmission amount are calculated, and thus are converted into luminance values of, for example, 256 gradations. In addition, in a state where feature extraction filter processing for edge detection and the like has been performed, the X-ray inspection image is stored and retained in an image data format that can be displayed on an operation input screen 70 as an X-ray inspection image of the workpiece W.

In addition, the article inspection program 51 can perform image determination for foreign matter detection. For example, in synchronization with a timing at which the workpiece W passes through the inspection area Z1, the determination threshold value for foreign matter detection for each arrangement area A, B, C, or D, which has been stored in the article type registration/setting memory 63 of the data accumulation unit 35 is read out. Then, it is determined whether or not the pixel value exceeds the determination threshold value for each arrangement area, thereby it is possible to determine whether or not there is a foreign matter having a low X-ray transmittance (large X-ray absorption coefficient).

The configuration determination program 53 is configured to exhibit the function of the configuration determination unit that determines the main material configurations of the contents Wa to Wd of the workpiece W with respect to a reference workpiece having a similar configuration. For the configuration determination, the configuration determination program 53 includes a workpiece image input unit 53a (image input means) that inputs the image of the workpiece W from the camera 41 via the camera image input unit 42 as a character recognizable image and/or an image recognizable image, a recognition processing unit 53b that performs predetermined image recognition processing and character recognition processing based on image data of the workpiece W captured by the camera 41, and a material configuration determination unit 53c that has a function of determination means for determining the material configurations (any or combination of article name of the ingredient, the material type, the amount, and the like) of the plurality of contents Wa to Wd in the workpiece W based on the recognition information of the recognition processing unit 53b.

The image recognition processing by the recognition processing unit 53b is performed, for example, by extracting feature amounts (area, length, diameter, specific shape, number) related to the shape of an image or figure in a digital image from the camera 41, which is visual sensor information, and the color and brightness of an image forming a figure, the change in the color and brightness, the direction of the change, and the like. In addition, for example, statistical discriminant analysis, binarization by threshold discrimination, edge extraction, labeling processing, contour tracing, and the like are selectively performed to enable geometric feature amount extraction calculation and pattern recognition. In this manner, images of materials or ingredients that have the extracted feature amounts are recognized. Typically, character recognition is possible by, for example, reading characters on a food information label attached to the workpiece W, and image recognition is possible in a manner that, for example, a camera captures an image of a product sample.

Here, the reading of characters on a food information label will be described.

When capturing an image of a food information label, an image of the label attached to the product or a sample of the label to be attached is captured, an area of ingredients information is extracted by image recognition, and character recognition is performed. Then, when the characteristic ingredients are specified by character recognition, candidate for ingredients associated in advance are displayed.

In addition, data may be linked with a label printing system (not illustrated) that manages printed information on the food information label, a camera may capture an image of a barcode for product identification, and information of the characteristic ingredients for a lunch box produced with the barcode attached may be acquired from response information obtained by outputting the barcode information to the label printing system. As a result, it is also possible to acquire information on the serving and changes in ingredients for various campaigns from other systems.

Information regarding various campaigns can also be specified by campaign labels on which characters decorated with predetermined shapes and colors are printed.

Alternatively, the recognition processing unit 53b performs color gradation processing for converting a designated color into a gray image of 256 gradations with the highest brightness gradation, color binarization processing of extracting only a color range designated based on the threshold value from multi-gradation of 256 gradations for each of RGB, and the like. Further, in a case where a Bayer type camera is adopted, pre-processing such as Bayer conversion on the output image data of the camera 41 may be performed.

Here, the recognition processing unit 53b of the configuration determination program 53 has functions (recognition processing means) of performing character recognition and/or image recognition of the input image by the image input function of the workpiece image input unit 53a, and acquiring first material information corresponding to at least the specific content in the workpiece W, for example, any of the staple food Wa, the main dish Wb, the side dish Wc, and the sub-side dish Wd in the packed lunch box W. In addition, the specific contents in the workpiece W referred to here are any of the main ingredients and ingredients of the rice ball packaged in an openable transparent cover or pack-like container and attached with an ingredient display sticker, or may be either the main ingredients or the ingredients of noodles packaged in an openable transparent container and attached with an ingredient display sticker, and may be a food material or a drug stored inside a transparent box or excluded depending on the article type.

Figure 4:
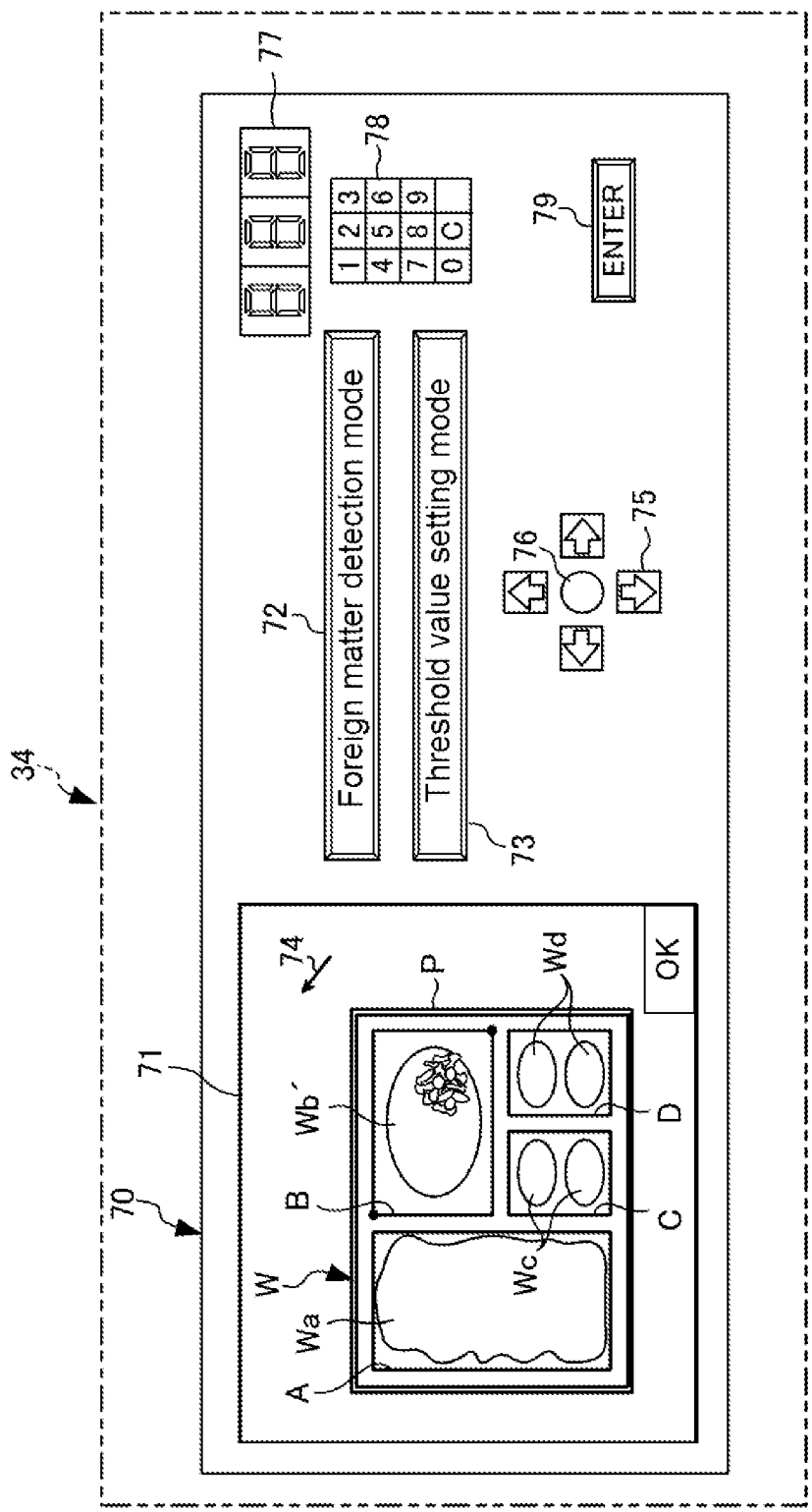
FIG. 4 is an explanatory diagram of an example of an operation screen for an operation mode selection and various setting operations in the article inspection apparatus according to the embodiment of the present invention.

In addition, the material configuration determination unit 53c of the configuration determination program 53 can cooperate with the recognition processing unit 53b to detect another content similar to the specific content with reference to the reference workpiece having the similar configuration, for example, a main dish Wb' in the workpiece W of a packed lunch box as illustrated in FIG. 4, based on a result obtained by performing character recognition and/or image recognition of the input image of the workpiece image input unit 53a, and can acquire second material information corresponding to a difference from the first material information corresponding to the specific content Wb described above, such as the added material or topping and the ingredients of changed source, or such as a significant increase or decrease (Wb'-Wb) of a known ingredients.

Further, the configuration determination program 53 has a configuration determination function of specifying a plurality of arrangement areas A to D in the workpiece W captured by the camera 41, performing predetermined recognition processing such as image recognition and character recognition based on image data of contents Wa to Wd such as the ingredient of each area, for each specified arrangement area A, B, C, or D, and determining the material configuration of the content Wa, Wb, Wc, or Wd in each area.

The configuration determination program 53 has functions of comparing the material configuration of each content Wa, Wb, Wc, or Wd in each of the arrangement areas A, B, C, or D with the registration information of the known material configuration, and determining whether or not there is a similar material configuration, for each arrangement area.

The sensitivity adjustment program 54 is configured to estimate a sensitivity influence and appropriate management sensitivity on the predetermined detection value such as the X-ray transmission amount by the determined material configuration, based on the information of the sensitivity influence material stored in the management sensitivity memory 64, and to propose and output adjustment of the determination criterion such as the determination threshold value of the article inspection so that appropriate management sensitivity is obtained in accordance with the estimated result. The sensitivity adjustment program 54 performs the above operations under a condition that the configuration determination program 53 determines the material configuration for the content arranged in each arrangement area A, B, C, or D, for example, the main dish Wb in the arrangement area B, for each of the plurality of arrangement areas A to D.

The sensitivity adjustment program 54 exhibits the functions of the sensitivity influence determination unit 54a and the sensitivity adjustment proposal unit 54b illustrated in FIG. 1. The sensitivity influence determination unit 54a referred to here has a function of determining whether the material configuration related to the sensitivity influence material from the management sensitivity memory 64 is changed, in a case where there is the reference workpiece having a similar configuration in a new workpiece W inspected based on the material configuration information of the workpiece to be inspected based on the material configuration information of the workpiece W from the configuration determination program 53. The sensitivity adjustment proposal unit 54b has a function of estimating the change degree of the detection sensitivity of a predetermined detection value such as the X-ray transmission amount corresponding to the change of the material configuration related to the sensitivity influence material, based on the determination result of the sensitivity influence determination unit 54a and the information stored in the management sensitivity memory 64, and proposing and outputting the adjustment of the determination criterion such as the determination threshold value of the article inspection so as to obtain the appropriate management sensitivity in accordance with the estimation result.

Furthermore, the sensitivity adjustment program 54 is configured to, when the configuration determination program 53 determines that a significant partial change (second material information described above, for example, a difference between the main dishes Wb' and Wb) for changing the material configuration of the inspection target has occurred in any of the plurality of arrangement areas A to D, propose and output the adjustment of the determination criterion for the article inspection with respect to the predetermined detection value such as the X-ray transmission amount for any content (for example, the main dish Wb') corresponding to the arrangement area A, B, C, or D in which the partial change is performed, that is, the determination threshold value (limit) for detecting a foreign matter or a missing item.

As illustrated in FIG. 4, in the article inspection apparatus 10 in the present embodiment, the operation input screen 70 for performing an operation input such as setting and a selection instruction from the operation input unit 33 configured by a touch panel, a tablet terminal, or the like is displayed on the display unit 34 configured by a liquid crystal display or the like.

On the operation input screen 70, for example, when the workpiece W on the transport unit 11 is irradiated with an X-ray from the X-ray source 21 of the inspection unit 12, and X-ray transmission image data corresponding to each workpiece W for each inspection period is stored in the X-ray image memory 61, the X-ray transmission image of the workpiece W being inspected is displayed on an inspection screen 71 as illustrated in FIG. 4. The result of determining whether or not there is a foreign matter and there is a missing item is displayed on the inspection screen 71 with characters such as "OK" or "NG". The X-ray transmission image here may be subjected to feature extraction filter processing or the like for emphasizing the image of the foreign matter.

On the operation input screen 70, a selection operation button 72 in a foreign matter detection mode, a selection operation button 73 in a threshold value setting mode, a cursor 74 that can be operated to move for designating an operation site, a plurality of movement operation buttons 75 that can be operated to move in a plurality of directions, for example, upward, downward, leftward, and rightward directions, a confirmation button 76 for confirming the operation at the time of selection, a numerical display 77 capable of displaying an input value and a setting value, a ten-key input unit 78, and an enter key 79 are displayed and output in a state in which an operation input and a selection operation are possible.

Next, the operation of the article inspection apparatus 10 in the present embodiment will be described, and an article inspection method according to an embodiment of the present invention, that can be performed by using the article inspection apparatus 10, will be described.

[Mode Selection]

Figure 5:
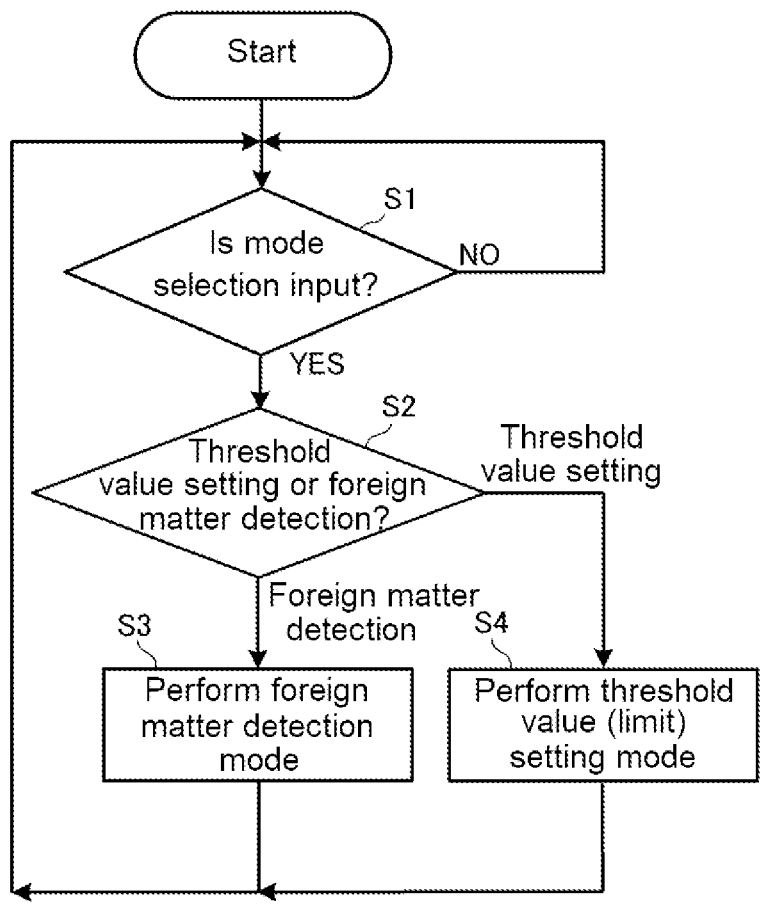
FIG. 5 is a flowchart illustrating a mode switching procedure for performing switching between a foreign matter detection mode and a threshold value setting mode, in accordance with a selective mode selection input in the article inspection apparatus according to the embodiment of the present invention.

First, an operation input procedure for a mode selection by pressing the selection operation button 72 in the foreign matter detection mode or pressing the selection operation button 73 in the threshold value setting mode will be described with reference to the flowchart in FIG. 5.

First, until the operator who decides the operation conditions and the like of the article inspection apparatus 10 performs an operation of pressing either the selection operation button 72 in the foreign matter detection mode or the selection operation button 73 in the threshold value setting mode, the CPU 31 checks whether or not a mode selection operation is input, for each predetermined time (NO in Step S1).

Then, when the operation for mode selection is input (YES in Step S1), it is determined whether the selection operation of pressing either the selection operation button 72 in the foreign matter detection mode or the selection operation button 73 in the threshold value setting mode has been made (Step S2). At this time, when the selection operation button 72 in the foreign matter detection mode is selected, then the foreign matter detection program in the program storage unit 32 is activated to perform the operation in the foreign matter detection mode (Step S3). On the other hand, at this time, when the selection operation button 73 in the threshold value setting mode is selected, then the parameter setting program capable of inputting and increasing/decreasing the setting of the threshold value of the program storage unit 32 is activated to perform the operation in the threshold value setting mode (Step S4).

[Foreign Matter Detection Mode]

The procedure of the operation control in the foreign matter detection mode and the procedure of an operation control during a sensitivity test (test measurement) to be described later are substantially similar to those in the conventional article inspection apparatus, for example, those disclosed in Patent Document 1. For example, when the button 73 in the foreign matter detection mode is pressed, an article inspection program capable of performing a foreign matter detection is activated by a mode execution program (not illustrated) in the program storage unit 32, and thus the foreign matter detecting processing is performed.

At this time, the CPU 31 outputs a drive command to each of the drive circuits 25, 27, and 28. Irradiation with an X-ray is performed in a fan beam shape perpendicular to the transport direction D1 of the workpiece W placed on the conveyor belt 11a from the X-ray source 21 within the inspection area Z1. Then, the transport unit 11 operates by rotation driving of the transport driving motor 26, and the transport of the workpiece W being a lunch box in which the ingredients Wa to Wd are used as the contents is started.

Then, when the workpiece W passes between a light emitter and a light receiver of the article detection sensor 24, the X-rays transmitted through the workpiece W are detected by the X-ray detector 22 at a predetermined timing, and are converted into an electric signal corresponding to a predetermined detection value to generate an X-ray line sensor image. The generated image is sequentially taken into the X-ray image memory 61 via the X-ray image input unit 23 (information storage step).

During this time, the image determination processing for foreign matter detection is performed in synchronization with the passage of the ingredients Wa to Wd, which are the contents of the workpiece W, through the inspection area Z1, so that, for each arrangement area A, B, C, or D stored in the X-ray image memory 61, image determination for foreign matter detection is performed by the above-described article inspection program 51 using the corresponding foreign matter detection threshold value.

[Threshold Value Setting Mode]

Figure 6:
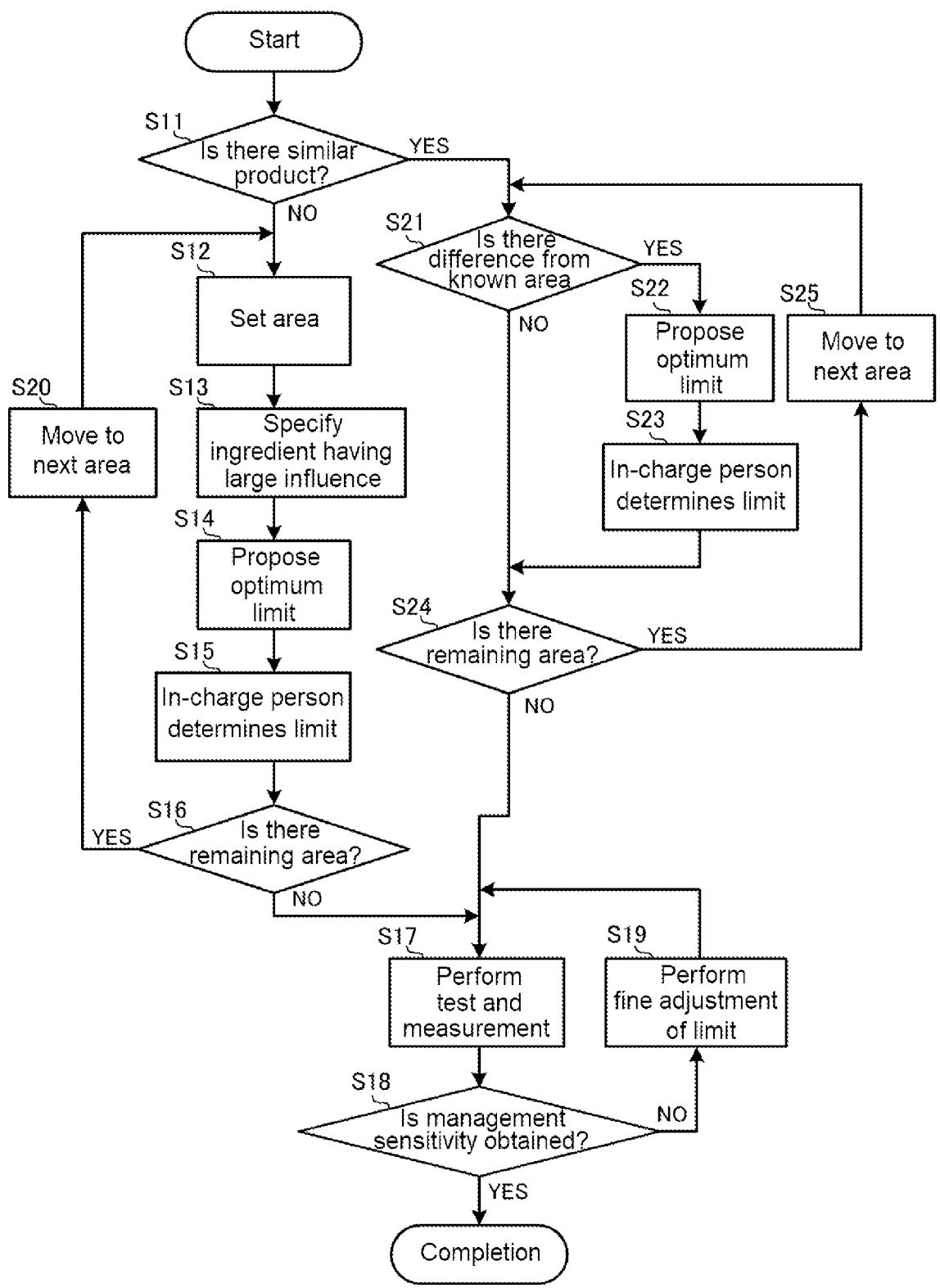
FIG. 6 is a flowchart illustrating a procedure of a limit setting task and a sensitivity test in accordance with whether or not there is a similar article type in the article inspection apparatus according to the embodiment of the present invention.

In the case of the operation in the threshold value setting mode, first, prior to threshold value setting, when the operator presses the selection operation button 73 in the threshold value setting mode on the operation input screen 70, a threshold value setting program 52 in the program storage unit 32 is executed. Then, threshold value setting processing as illustrated in FIG. 6 is performed.

The threshold value setting processing is provided for setting inspection parameters for determining the quality in article inspection. Since an occurrence of a situation in which an inappropriate threshold value is set by an erroneous operation is prevented, only an administrator whom an access is permitted by password authentication or the like can perform a portion of the processing.

First, it is checked whether or not regarding a new type of workpiece W set as a setting target for the current threshold value (limit in FIG. 6), that is, a product that is manufactured and inspected on the manufacturing line from now on, or a product that has started manufacturing and has a material configuration similar to the product before reaching the inspection process, an article type is already registered (Step S11).

At this time, when there is a monitoring image from the camera 41, by executing the configuration determination program 53, the pack P of the workpiece W and the material configurations of the ingredients Wa to Wd stored therein are specified by image recognition processing and character recognition processing. Furthermore, by executing the sensitivity adjustment program 54, the material configuration (including the pack) similar to the workpiece W being a threshold value setting target is searched in the management sensitivity memory 64. When the similar material configuration is searched, it is determined that there is a similar product (YES in Step S11).

Here, when a similar material configuration is searched and the camera image corresponding to the material configuration is stored and retained in the article type registration/setting memory 63, the image captured by the camera 41 this time and the searched, stored, and retained image may be displayed side by side so that the images can be compared with each other. Even though the material configuration looks similar, the operator may be enabled to grasp inappropriate data that cannot be used as a reference for setting the threshold value this time.

Also, even though there is no monitoring image from the camera 41, for example, in a case where the article type registration information is used as a base during article type registration of the workpiece W being the threshold value setting target, and when a sample image of the workpiece W captured in advance can be used, it is determined that there is a similar product. Processing when the sample image at the time of article type registration can be used will be described later with reference to FIG. 7.

In the threshold value setting processing (limit adjustment) illustrated in FIG. 6, when an article type of a product having the material configuration similar to the workpiece W being a setting target this time is not yet registered, it is determined that the similar material configuration is not shown in the management sensitivity memory 64, and there is no similar product (NO in Step S11).

In this case, the operator performs a touch operation on the operation input screen 70 in order to designate a plurality of arrangement areas A to D in the pack P of the workpiece W, or selectively performs a plurality of movement operation buttons 75 arranged in a cross shape or radially on the operation input screen 70 to move the cursor 74. The arrangement areas A to D are respectively designated by pressing the confirmation button 76 after selecting a plurality of points or lines capable of specifying a contour shape of each of the arrangement areas A to D or selecting an area surrounded by the selected contour line (Step S12). In the case of the workpiece W illustrated in FIG. 4, and, for example, the arrangement area B can be designated by designating two vertices (black circle positions in FIG. 4) of the diagonal corners of the quadrangle.

Then, processing of specifying an ingredient having a large sensitivity influence in the designated area of the workpiece W, for example, the ingredient in the arrangement area B, for example, the main dish Wb is performed (Step S13). Here, the large influence degree refers to a sensitivity influence degree having an extent requiring adjustment of the determination threshold value because there is a concern that the detection accuracy decreases if the determination threshold value of a foreign matter or a missing item is maintained with respect to the addition of the material or the significant increase or decrease in the amount of the material.

In this case, by executing the configuration determination program 53, the material configuration in each arrangement area A, B, C, or D of the workpiece W is classified and specified by image recognition or character recognition using the image from the camera 41 for each arrangement area. Furthermore, by executing the sensitivity adjustment program 54, the similar material configuration in the management sensitivity memory 64 is extracted for each of the arrangement areas A, B, C, and D, and the main material configuration having a large influence degree (sensitivity influence) on the determination threshold value of a foreign matter or a missing item and the influence degree thereof are read.

At this time, for each arrangement area A, B, C, or D, the configuration of the specific content in the area, for example, the material having a large sensitivity influence in the material configuration of the main dish Wb in the lunch box pack W is acquired as first material information.

Then, the sensitivity influence of the material corresponding to the acquired first material information is estimated based on the sensitivity influence information in the management sensitivity memory 64, and the required determination threshold value is proposed and output as the limit corresponding to the optimum inspection sensitivity (Step S14). Then, an operation input for determining the limit is requested to the person in charge who will be the operator (Step S15). Along with the display of the optimum limit, the direction and adjustment width of the limit adjustment are temporarily displayed, and the display information is stored and retained in the management sensitivity memory 64 in a readable manner up to the processing stage of fine adjustment of the limit, which will be described later.

Then, it is determined whether or not the necessary limit setting/adjustment has been completed for each of the arrangement areas A, B, C, and D as described above (Step S16). When there is the remaining area that is not yet set/adjusted (YES in Step S16), the remaining area is sequentially (Step S20) processed after setting the remaining area (Steps S12 to S15).

Here, whether or not the necessary limit setting/adjustment has been completed can be determined at the stage when the limit setting/adjustment for one arrangement area A, B, C, or D is completed, and for example, by requesting a selection operation of the next setting area or performing a selection operation of the end of the setting/adjustment of the limit. Alternatively, it is conceivable to estimate whether or not there is a remaining area from the size of the image area that is not used for area setting in the image of the workpiece W.

When limit setting/adjustment has been completed for all arrangement areas A to D, the operator is requested to perform test article inspection with the inspection unit 12 by using product samples and test pieces of the workpiece W or using articles containing foreign matters or missing items. The inspection sensitivity corresponding to the value of the determination threshold value is measured by test, and it is checked whether or not the required inspection sensitivity (referred to as management sensitivity below) enabling the accurate article inspection is obtained (Step S17).

The point that the management sensitivity being the required inspection sensitivity is obtained means that, in a case where, for example, a test piece that has the minimum size and requires foreign matter detection is arranged in each arrangement area A, B, C, or D, the test piece is detected, and the inspection result is determined to be NG. Also, in the test measurement, for all the arrangement areas A to D, in a case where the test piece having the minimum size is disposed in a single area, the test piece is detected and the detection is repeatedly performed until it is checked whether or not the inspection result is determined to be NG.

Then, it is determined whether or not the management sensitivity is obtained depending on whether or not there is a region where the inspection result is not determined to be NG during the test measurement and the required management sensitivity is not obtained (Step S18).

Then, in a case where there is an area where the required management sensitivity is not obtained, for the arrangement area A, B, C, or D where the sensitivity is insufficient, the above-described stored and retained limit value, and the adjustment direction and adjustment width are displayed again on the operation input screen 70, and a display requesting the operation input for fine adjustment of the limit is made.

Specifically, for each of the arrangement areas A, B, C, or D with insufficient sensitivity, for example, the limit value displayed on the numerical display 77 on the operation input screen 70, a numerical value is manually input by using the ten-key input unit 78 or a selection operation of the highlighted vertical movement operation key 75 is performed, and then is confirmed by the enter key 79. In this manner, the fine adjustment of the limit is performed (Step S19).

After such fine adjustment of the limit, test measurement is performed again (Step S17), and then it is determined again whether or not the management sensitivity is obtained (Step S18).

At this time, when the required management sensitivity is obtained, the processing of setting each arrangement area and adjusting the limit for the current workpiece W without similar products is ended.

On the other hand, when it is determined in the first determination step S11 that there is a similar product (YES in Step S11), regarding the workpiece W as the setting target of the current threshold value (limit in the drawing), by executing the configuration determination program 53 based on the image from the camera 41 and the like, and the pack P of the workpiece W and the material configurations of the ingredients Wa and Wb stored in the pack P are specified already by the image recognition or character recognition processing. The execution of the sensitivity adjustment program 54 causes the material configuration (including the pack P) similar to the workpiece W being the threshold value setting target to be searched in the management sensitivity memory 64, and the similar material configuration is shown.

In this case, for each arrangement area A, B, C, or D, other contents that are similar to the specific contents that have a large sensitivity influence in the similar product, for example, regarding the main dish Wb' similar to the main dish Wb in the lunch box pack W of the similar product, in addition to the above-described first material information included in the similar material configuration, second material information corresponding to the difference from the first material information is acquired as the added food material (Wb'-Wb) or the increase or decrease (Wb'-Wb) of the known food material. Then, it is checked whether or not the significant difference of the material configuration from the similar product for any of the known arrangement areas A to D is detected as the second material information (Step S21).

Then, the sensitivity influence of the material corresponding to the acquired second material information is estimated based on the sensitivity influence information in the management sensitivity memory 64, and the required and adjusted determination threshold value is proposed and output as the optimum limit (Step S22). Then, an operation input for determining the limit is requested to the person in charge who will be the operator (Step S23). Along with the display of the optimum limit, the direction and adjustment width of the limit adjustment are temporarily displayed, and the display information is stored and retained in the management sensitivity memory 64 in a readable manner up to the processing stage of fine adjustment of the limit.

Then, it is determined whether or not the necessary limit adjustment for each arrangement area A, B, C, or D as described above has been completed (Step S24), and there is the remaining area that is not adjusted (YES in Step S24), the process moves to the next area (Step S25), and the processes (Steps S21 to S23) after determination of whether or not there is a difference in the material configuration for each area are executed for the remaining area.

Here, whether or not the necessary limit adjustment has been completed can be automatically determined based on whether or not there is a difference in the material configuration for each area. A selection operation of the setting area may be requested or a selection operation may be made to end the limit adjustment, at the step at which the limit adjustment has been completed for one arrangement area.

Then, when the limit setting/adjustment has been completed for all the arrangement areas A to D, the test measurement of the above-described inspection sensitivity is performed by using product samples and test pieces of the workpiece W, or using samples containing foreign matter and missing items. Then, it is checked whether or not the management sensitivity is obtained (Steps S17 and S18). The fine adjustment of the limit (Step S19) when there is an area where the inspection result is not determined to be NG during the test measurement and there is an area where the required management sensitivity is not obtained (NO in Step S18) is as described above.

[In Registration of Article Type]

Figure 7:
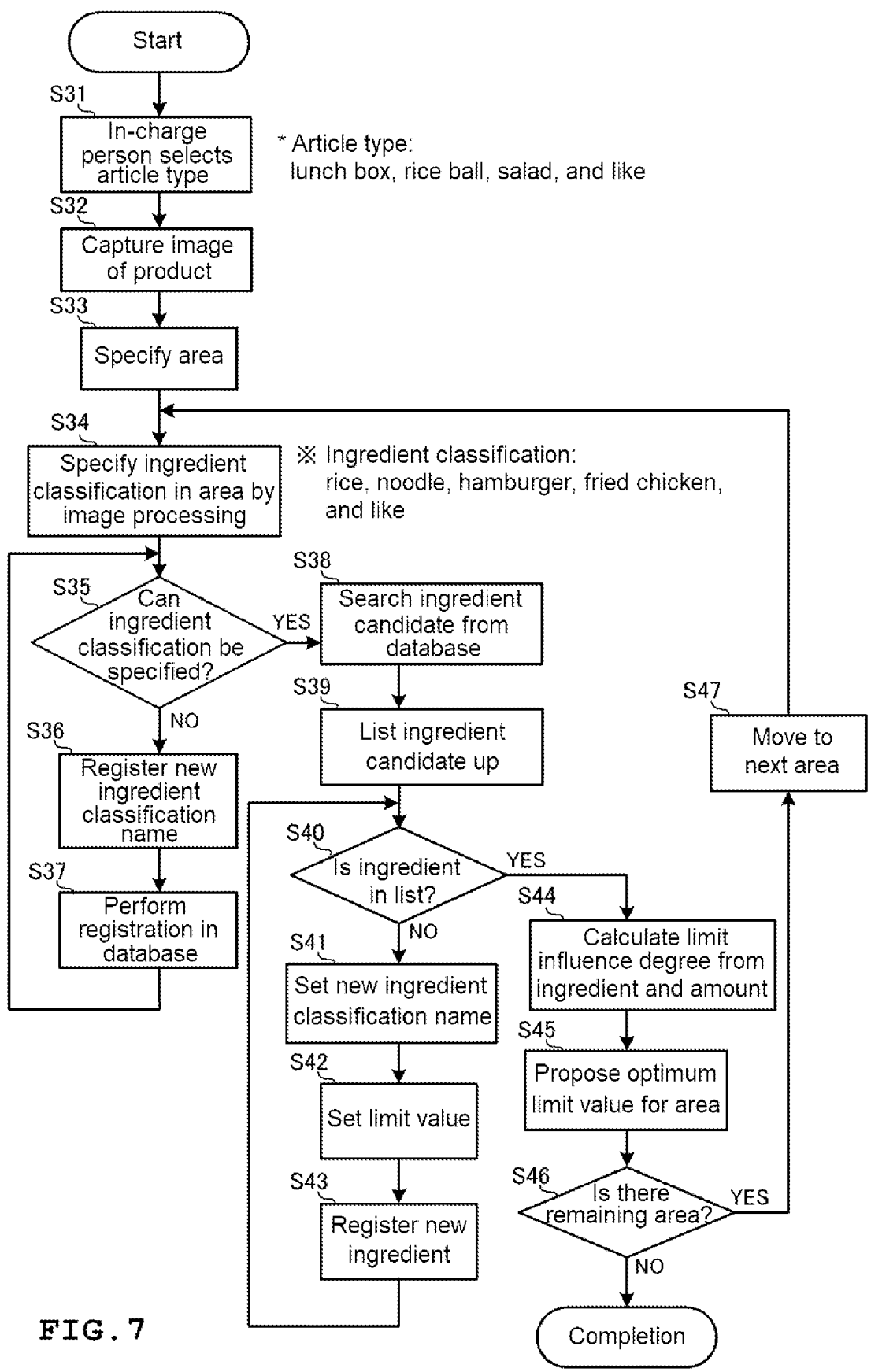
FIG. 7 is a flowchart illustrating a procedure of a manual limit setting task such as registration of an article type in the article inspection apparatus according to the embodiment of the present invention.

As illustrated in FIG. 7, in a case where area setting is performed at the time of article type registration, first, the type of product as the workpiece W is selected by an in-charge person who is the operator (Step S31). For example, regarding products such as lunch boxes, rice balls, and salads sold at convenience stores, which are packaged in a transparent upper surface side and whose material configuration can be grasped by capturing of the camera 41, the article type is displayed in the form of step-by-step classifications, lists, and the like, and any of the article types, which is the registration target, is subjected to the selection operation. In this manner, the target article type is selected.

Then, an image of a sample of the workpiece W of that article type is captured by the camera 41 (Step S32).

Then, an image of a product, for example, a lunch box is read from the camera 41, and a plurality of movement operation buttons 75 in the operation input screen 70 are selectively pressed to designate a plurality of arrangement areas A to D in the pack P of the workpiece W. Move the cursor 74 by operating to select a plurality of points or lines that can specify the contour shape of each arrangement area A to D, or select the area surrounded by the selected contour lines, and then press the OK button. By pressing the confirmation button 76, each of the arrangement areas A to D is designated and specified (Step S33).

Then, the configuration determination program 53 is executed based on the image captured by the camera 41 and information on the specified arrangement areas A to D. Thus, for each arrangement area A, B, C, or D, the pack P of the workpiece W, the classification of ingredients stored in the pack P, for example, the classification of rice, noodles, hamburgers, and fried chicken, and the material configuration of each ingredient are specified by image recognition and character recognition processing (Step S34).

Then, it is checked whether or not the classification of the ingredients can be specified (Step S35). When it is not possible to perform the classification of the ingredients (NO in Step S35), then an operation input for registering the classification name of the new ingredient is performed (Step S36), and is registered in the database in the article type/registration setting memory 63 of the data accumulation unit 35 (Step S37).

After this registration enables the material classification to be specified (YES in Step S35), the configuration determination program 53 is executed to extract candidates for the ingredients constituting the material configuration of the material classification from the article type registration/setting memory 63 of the data accumulation unit 35 (Step S38), and list up the candidates in a form that allows the selection operation of the corresponding ingredient (Step S39).

Then, whether or not there is a corresponding ingredient in the list is checked by a selection operation input (Step S40). When there is no corresponding ingredient (NO in Step S40), a new ingredient and the classification name of the new ingredient are set and input (Step S41).

Then, the sensitivity adjustment program 54 is executed to search a material configuration (including the pack P) similar to the material configuration obtained by executing the configuration determination program 53, in the management sensitivity memory 64 based on the image captured by the camera 41 and the information on the specified arrangement area. When the similar material configuration is obtained, the sensitivity influence of a material corresponding to the second material information acquired as a difference from the corresponding material configuration is estimated based on the information of the sensitivity influence in the management sensitivity memory 64, and the required determination threshold value is set as a provisional limit (Step S42). Then, the new ingredient is registered in association with the predetermined detection value such as the X-ray transmission amount and the determination threshold value related to the foreign matter detection and the missing item detection (Step S43).

When a new ingredient is registered (corresponding to Steps S41 to S43), only the registration of the ingredient is performed in advance before the product actually served with the ingredient is manufactured, the series of processes may be ended in Step S43. In other words, only the work of registering new ingredients may be enabled to be performed in advance as preparations for manufacturing products on which the ingredients are actually served. As a result, Step S40 becomes YES at the time of actual production start, and threshold value setting processing can be executed smoothly for products including new ingredients.

When the corresponding ingredient is present in the list (YES in Step S40), recognition information is updated by image processing, character recognition, or the like of a target area obtained by executing the configuration determination program 53 in consideration of the registered ingredient name, the classification name and the like of the ingredient, and the like. Therefore, for each arrangement area, it is possible to calculate the degree of sensitivity influence based on the type and amount (or mass) of the ingredient (Step S44), and it is possible to propose and output the optimum limit value for the area (Step S45).

Then, it is checked whether or not there is a remaining area (Step S46). When there is a remaining area for which the registration of the ingredients of the new classification and the proposal output of the limit value have not been completed (YES in Step S46), the process moves to the next area (Step S47). Then, the processes (Steps S34 to S45) after the specifying step of ingredient classification for each arrangement area based on the captured image of the camera 41 and the specified arrangement area information is repeatedly performed until there is no remaining area (NO in Step S46).

As described above, in the present embodiment, when the article inspection in which the workpiece W including the ingredients Wa to Wd being the plurality of contents and the pack P is inspected based on the inspection image, the information on the predetermined detection value such as the X-ray transmission amount related to the X-ray inspection image is stored in the X-ray image memory 61 (information storage step). The camera 41 captures an image of the workpiece W (article image capturing step). The predetermined recognition processing such as the image recognition and the character recognition is performed based on the captured image data of the workpiece W to specify the sensitivity influence material having a significant influence on the X-ray transmission amount of the workpiece W and the like or to determine the material configuration of such a content (configuration determination step). In this state, the detection sensitivity for the predetermined detection value such as the X-ray transmission amount corresponding to the material configuration is estimated based on the determined material configuration of the content and the information stored in the management sensitivity memory 64, and the determination threshold value (limit) being the determination criterion for the article inspection is proposed and output to obtain the appropriate management sensitivity (proposal output step).

Therefore, in the article inspection, the predetermined recognition processing is performed based on the image data of the image-captured workpiece W. In addition, based on the material configuration of the content having a large sensitivity influence on the workpiece W and the information regarding the sensitivity influence material, which is stored in the management sensitivity memory 64, the detection sensitivity is estimated in consideration of the degree of increase or decrease of the predetermined detection value such as the X-ray transmission amount corresponding to the material configuration of the content. Then, the determination criterion for the article inspection is proposed and output as the suitable reference value corresponding to the estimated sensitivity. As a result, it is possible to sufficiently reduce the task burden of the task of setting the determination criterion such as the determination threshold level, which is an inspection parameter for each article type. In addition, even an inexperienced administrator or the like can perform the appropriate setting task with a light burden.

Moreover, in the present embodiment, in the case where similar articles of many types are to be inspected, it is possible to propose a reference value that is suitably adjusted for the determination criterion for similar types, so that it is possible to more reduce the task burden of the task of setting the determination threshold level and the like used as the inspection parameter for each type.

Further, in the present embodiment, when the information on the material configuration of the content of the workpiece W is acquired by the configuration determination program 53, for the material configuration, it is possible to grasp the sensitivity influence level with respect to the predetermined detection value such as the X-ray transmission amount related to the inspection image, based on the information stored in the management sensitivity memory 64 being a sensitivity influence material storage unit. Therefore, it is possible to propose and output an appropriate determination criterion for article inspection in accordance with the material configuration having a significant influence on the predetermined detection value.

Further, in the present embodiment, the configuration determination program 53 acquires the first material information corresponding to the material configuration of a plurality of contents in the workpiece W from the results of the predetermined recognition process, and determines the content having a significant influence on the predetermined detection value of the workpiece W based on the acquired information. Thus, when the content having the significant influence on the predetermined detection value is changed, the adjustment of the required determination criterion for the article inspection can be immediately proposed and output.

Further, in the present embodiment, the configuration determination program 53 includes image input means 53a for inputting an image of the workpiece W as a character-recognizable image and/or an image-recognizable image, and a recognition processing means 53b for performing recognition processing on the input image to acquire the first material information corresponding to the material configuration of at least a specific content in the workpiece W. Thus, when the first material information having a significant influence on the predetermined detection value is acquired, the required determination criterion can be proposed and output in a state where the sensitivity influence level for the detection sensitivity, such as the X-ray transmission amount, related to the inspection image is precisely grasped.

In addition, in the present embodiment, for example, for the material configuration of another content Wb', which is similar to the material configuration of the specific content Wb, second material information corresponding to the difference from the first material information is acquired based on the recognition processing result in the recognition processing means 53b. Thus, for the workpiece W including another similar content Wb' instead of the specific content Wb, it is possible to quickly, easily, and precisely perform the task of setting the determination threshold level as the inspection parameter for each article.

Further, in the present embodiment, the workpiece W has a configuration in which a plurality of contents Wa to Wd are arranged in a plurality of corresponding arrangement areas A to D, and the pieces of information on the predetermined detection values (such as the X-ray transmission amounts) related to the plurality of contents Wa to Wd is stored in association with the plurality of arrangement areas A to D, respectively. In this manner, it is possible to precisely propose and output the determination criterion for each arrangement area in accordance with the material configuration of the content Wa, Wb, Wc, or Wd in the arrangement area A, B, C, or D.

In addition, for each of the plurality of arrangement areas A to D, by comparing the material configuration of the content of which the article type has already been registered with the acquired information regarding the material configuration of the content being the inspection target by predetermined recognition processing, it is determined whether or not the partial change having a significant influence on the predetermined detection value has occurred. Therefore, it is possible to precisely propose and output the necessary adjustment of the determination criterion while using the setting information of the content of the registered article type.

As described above, in the present embodiment, it is possible to provide the article inspection apparatus and the article inspection method capable of reducing a burden of the task of setting the determination criterion being the inspection parameter for each article type of workpiece W, while ensuring the required inspection sensitivity in the article inspection of the X-ray inspection type.

In the article inspection method described above, the pack P and the ingredients Wa to Wd contained in the pack P have been described. For example, only an empty pack P in which the inspection articles Wa to Wd are not stored as ingredients may be transported in a manner that the X-ray irradiation condition of the X-ray source 21 is set to be a low output by the X-ray generator drive circuit 28, or an image processing condition is set in an area extraction processing for recognizing the arrangement areas A to D of the pack P. As a result, it is possible to generate X-ray images corresponding to the arrangement areas A to D of the pack P, so that it is possible to designate the arrangement areas A to D with high accuracy.

In addition, the arrangement area referred to in the present invention is not limited to the recessed storage area formed in the resin pack, but may be a recessed area or an enclosed area on an inspection tray. Furthermore, the upper lid and cover are not limited to being transparent, and may be nearly translucent, or may be perforated or have an opening. For example, when image capturing is performed with the camera 41, the upper lid and cover only need to open.

Furthermore, in the above-described embodiment, the description has been made on the assumption that the predetermined inspection image used in the article inspection is used as the X-ray inspection image corresponding to the transmission amount distribution of X-rays that have been transmitted through the workpiece W. The present embodiment can be applied to an article inspection using an inspection image by another observation method. Thus, the predetermined detection value referred to in the present invention is not limited to the X-ray transmission amount. For example, as the predetermined detection value, a temperature or the like obtained from a thermograph for observing a heat dissipation state and a cooling state of the workpiece W may be used. The invention is also conceivable to be applied to a case where the sensitivity influence of such a predetermined detection value occurs depending on the material configuration.

As described above, according to the present invention, it is possible to provide an article inspection apparatus and an article inspection method capable of reducing the burden of setting the determination criterion being the inspection parameter for each article type, while ensuring required inspection sensitivity. The present invention is useful for general article inspection apparatuses and methods for inspecting articles based on inspection images of the articles to be inspected.

DESCRIPTION OF REFERENCE NUMERALS AND SIGNS

10 Article Inspection Apparatus (X-Ray Inspection Apparatus)
11 Transport Unit
11a Conveyor Belt
11b Upstream Roller (Driving Roller)
11c Upstream Roller
11d, 11e Downstream Roller
12 Inspection Unit
21 X-Ray Source
22 X-Ray Detector
23 X-Ray Image Input Unit
24 Article Detection Sensor
25 X-RAY DETECTOR DRIVE CIRCUIT
26 Transport Driving Motor
27 Motor Drive Circuit
28 X-Ray Generator Drive Circuit
30 Control Circuit
31 CPU
32 Program Storage Unit
33 Operation Input Unit
34 Display Unit
35 Data Accumulation Unit
41 Camera (Article Image Capturing Unit)
42 Camera Image Input Unit
51 Article Inspection Program
52 Threshold Value Setting Program
53 Configuration Determination Program (Configuration Determination Unit)
53a Workpiece Image Input Unit (Image Input Means)

53b Recognition Processing Unit (Recognition Processing Means)
53c Material Configuration Determination Unit (Determination Means)
54 Sensitivity Adjustment Program (Proposal Output Unit)
54a Sensitivity Influence Determination Unit
54b Sensitivity Adjustment Proposal Unit
61 X-Ray Image Memory (Information Storage Unit)
62 Camera Image Memory
63 Article Type Registration/Setting Memory
64 Management Sensitivity Memory (Sensitivity Influence Material Storage Means)
A, B, C, D Arrangement Area (Plurality of Arrangement Areas)
W Workpiece (Inspection Article)
Wa Staple Food (Ingredients, Contents)
Wb Main Dish (Ingredients, Contents)
We Side Dish (Ingredients, Contents)
Wd Sub-Side Dish (Ingredients, Contents)
Z1 Inspection Area

What is claimed is:

1. An article inspection apparatus that inspects an inspection article by using an inspection image, the apparatus comprising:
   a memory that stores information of a predetermined detection value related to the inspection image;
   a camera configured to capture an image of the inspection article;
   one or more processors collectively configured to determine a material configuration of the inspection article by performing predetermined recognition processing based on image data of the inspection article obtained by capturing of the camera,
   wherein the article inspection apparatus is configured to inspect the inspection article based on a determination criterion for the inspection, the determination criterion based on a detection sensitivity to the predetermined detection value,
   wherein the detection sensitivity is determined prior to inspection of the inspection article and is based on an x-ray transmission amount under a predetermined x-ray irradiation condition, and
   wherein the detection sensitivity is further determined based on the material configuration of the inspection article compared with a material configuration of a reference article.

2. The article inspection apparatus according to claim 1, wherein the memory further stores information of a sensitivity influence on the predetermined detection value of each of a plurality of materials, and
   wherein the one or more processors are collectively configured to estimate the detection sensitivity to the predetermined detection value based on information of the material configuration acquired by the predetermined recognition processing and stored information in the memory, which corresponds to the material configuration.

3. The article inspection apparatus according to claim 1, wherein the one or more processors are collectively configured to:
   input the image of the inspection article as a character-recognizable image and/or an image-recognizable image, and
   perform character recognition and/or image recognition of the input image and acquire first material information corresponding to at least a material configuration of a specific content in the inspection article.

4. The article inspection apparatus according to claim 2, wherein the one or more processors are collectively configured to:
   input the image of the inspection article as a character-recognizable image and/or an image-recognizable image, and
   perform character recognition and/or image recognition of the input image and acquire first material information corresponding to at least a material configuration of a specific content in the inspection article.

5. The article inspection apparatus according to claim 3, wherein the one or more processors are collectively configured to acquire second material information regarding a material configuration of another content, based on a result obtained by performing character recognition and/or image recognition of the input image, in addition to the first material information, the second material information corresponding to a difference from the first material information.

6. The article inspection apparatus according to claim 4, wherein the one or more processors are collectively configured to acquire second material information regarding a material configuration of another content, based on a result obtained by performing character recognition and/or image recognition of the input image, in addition to the first material information, the second material information corresponding to a difference from the first material information.

7. The article inspection apparatus according to claim 1, wherein the inspection article has a configuration in which a plurality of contents are arranged in a plurality of corresponding arrangement areas, and
   wherein the one or more processors are collectively configured to:
   determine a material configuration of a content in each of the plurality of arrangement areas by performing the predetermined recognition processing based on image data of the content in each corresponding arrangement area, for each of the plurality of arrangement areas, the image data being obtained by the camera, and
   propose and output a determination criterion for each of the plurality of arrangement areas based on a determination result.

8. The article inspection apparatus according to claim 2, wherein the inspection article has a configuration in which a plurality of contents are arranged in a plurality of corresponding arrangement areas, and
   wherein the one or more processors are collectively configured to:
   determine a material configuration of a content in each of the plurality of arrangement areas by performing the predetermined recognition processing based on image data of the content in each corresponding arrangement area, for each of the plurality of arrangement areas, the image data being obtained by the camera, and
   propose and output a determination criterion for each of the plurality of arrangement areas based on a determination result.

9. The article inspection apparatus according to claim 3, wherein the inspection article has a configuration in which a plurality of contents are arranged in a plurality of corresponding arrangement areas, and wherein the one or more processors are collectively configured to:
determine a material configuration of a content in each of the plurality of arrangement areas by performing the predetermined recognition processing based on image data of the content in each corresponding arrangement area, for each of the plurality of arrangement areas, the image data being obtained by the camera, and
propose and output a determination criterion for each of the plurality of arrangement areas based on a determination result.

10. The article inspection apparatus according to claim 5, wherein the inspection article has a configuration in which a plurality of contents are arranged in a plurality of corresponding arrangement areas, and
wherein the one or more processors are collectively configured to:
determine a material configuration of a content in each of the plurality of arrangement areas by performing the predetermined recognition processing based on image data of the content in each corresponding arrangement area, for each of the plurality of arrangement areas, the image data being obtained by the camera, and
propose and output a determination criterion for each of the plurality of arrangement areas based on a determination result.

11. The article inspection apparatus according to claim 7, wherein the memory further stores an article type and setting information of the inspection article together with information of the material configuration, and
wherein the one or more processors are collectively configured to determine whether or not a partial change having an influence on the predetermined detection value has occurred in the material configuration of the content corresponding to each arrangement area, based on the stored information and information acquired by the predetermined recognition processing, for each of the plurality of arrangement areas in the inspection article.

12. The article inspection apparatus according to claim 8, wherein the memory further stores an article type and setting information of the inspection article together with information of the material configuration, and
wherein the one or more processors are collectively configured to determine whether or not a partial change having an influence on the predetermined detection value has occurred in the material configuration of the content corresponding to each arrangement area, based on the stored information and information acquired by the predetermined recognition processing, for each of the plurality of arrangement areas in the inspection article.

13. The article inspection apparatus according to claim 9, wherein the memory further stores an article type and setting information of the inspection article together with information of the material configuration, and
wherein the one or more processors are collectively configured to determine whether or not a partial change having an influence on the predetermined detection value has occurred in the material configuration of the content corresponding to each arrangement area, based on the stored information and information acquired by the predetermined recognition processing, for each of the plurality of arrangement areas in the inspection article.

14. The article inspection apparatus according to claim 10, wherein the memory further stores an article type and setting information of the inspection article together with information of the material configuration, and
wherein the one or more processors are collectively configured to determine whether or not a partial change having an influence on the predetermined detection value has occurred in the material configuration of the content corresponding to each arrangement area, based on the stored information and information acquired by the predetermined recognition processing, for each of the plurality of arrangement areas in the inspection article.

15. An article inspection method of inspecting an inspection article by using an inspection image, the method comprising:
an information storage step of storing information of a predetermined detection value related to the inspection image;
an article image capturing step of capturing an image of the inspection article;
a configuration determination step of determining a material configuration of the inspection article by performing predetermined recognition processing based on image data of the inspection article, which is obtained by capturing in the article image capturing step;
an inspection step of inspecting an article based on proposing and outputting a determination criterion for the inspection based on a detection sensitivity of the inspection article to the predetermined detection value, the detection sensitivity based on the material configuration of the inspection article determined in the configuration determination step,
wherein the detection sensitivity is determined prior to the inspection step of the inspection article and is based on an x-ray transmission amount under a predetermined x-ray irradiation condition, and
wherein the detection sensitivity is further determined based on the material configuration of the inspection article compared with a material configuration of a reference article.

* * * * *